(12) United States Patent
Colas et al.

(10) Patent No.: US 7,066,309 B2
(45) Date of Patent: Jun. 27, 2006

(54) SUSPENSION SUPPORT DEVICE AND A VEHICLE INCLUDING SUCH A DEVICE

(75) Inventors: Patrice Colas, Vierzon (FR); Bernard Bouhier, Noyers sur Cher (FR); Pascal Carobolante, Saint Hilaire de Court (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/998,874

(22) Filed: Nov. 29, 2004

(65) Prior Publication Data

US 2005/0121272 A1    Jun. 9, 2005

(30) Foreign Application Priority Data

Dec. 9, 2003    (FR)    ................... 03 14428

(51) Int. Cl.
*F16F 9/00*    (2006.01)
(52) U.S. Cl. .................. 188/321.11; 267/293; 267/220
(58) Field of Classification Search ................ 267/292, 267/293, 294, 219, 220; 188/321.11
See application file for complete search history.

(56) References Cited

U.S. PATENT DOCUMENTS

| | | | | |
|---|---|---|---|---|
| 4,175,770 A | * | 11/1979 | Draisbach et al. .... | 280/124.155 |
| 4,462,608 A | | 7/1984 | Lederman ............ | 280/124.155 |
| 4,568,067 A | * | 2/1986 | Iwata ........................ | 267/220 |
| 4,756,516 A | | 7/1988 | Tondato ...................... | 267/153 |
| 4,909,642 A | * | 3/1990 | Hoermandinger ........... | 384/536 |
| 5,226,635 A | * | 7/1993 | Nakamura ................... | 267/220 |
| 5,248,134 A | * | 9/1993 | Ferguson et al. ........... | 267/220 |
| 5,330,166 A | * | 7/1994 | Aoki .......................... | 267/220 |
| 5,664,650 A | | 9/1997 | Kammel et al. ........ | 188/321.11 |
| 6,293,572 B1 | | 9/2001 | Robbins et al. ....... | 280/124.155 |
| 6,412,798 B1 | * | 7/2002 | De Fontenay et al. .................... | 280/124.147 |
| 6,572,089 B1 | | 6/2003 | Zietsch ....................... | 267/220 |
| 2003/0189278 A1 | * | 10/2003 | Kawada et al. ............. | 267/292 |

FOREIGN PATENT DOCUMENTS

| | | |
|---|---|---|
| EP | 0 268 393 | 5/1988 |
| FR | 2 642 488 | 8/1990 |
| FR | 2 815 580 | 4/2002 |

OTHER PUBLICATIONS

Patent Abstracts of Japan vol. 2003, No. 06, Jun. 3, 2003 & JP 2003 035333 A (Bridgestone Corp), Feb. 7, 2003 *Abstract*.

(Continued)

*Primary Examiner*—Devon Kramer
(74) *Attorney, Agent, or Firm*—McCracken & Frank LLP

(57) ABSTRACT

A suspension support device for a motor vehicle comprises an inner strength member comprising a support base and an annular side wall, an outer strength member having a side wall surrounding the side wall of the inner strength member, an elastomer body comprising a load-supporting portion interconnecting the inner and outer strength members. The outer strength member has a bottom portion located under the support base of the inner strength member, extending parallel to the support base and presenting a central passage for passing the top portion of a shock absorber. The side wall of the outer strength member includes a window between the support base of the inner strength member and the bottom portion of the outer strength member, the device including a cavity under the load-carrying portion of the elastomer body.

12 Claims, 1 Drawing Sheet

OTHER PUBLICATIONS

Patent Abstracts of Japan vol. 2003, No. 06, Jun. 3, 2003 & JP 2003 035334 A (Bridgestone Corp), Feb. 7, 2003 *Abstract*.

"Flexible Retaining Ring for Suspension Modules" Research Disclosure, Kenneth Mason Publications, Hampshire, GB, No. 441, Jan. 2001, p. 40, XP001127951-ISSN:0374-4353 *The whole document*.

Preliminary Search Report dated Jul. 11, 2004, Appl. No. FR 0 314 428.

* cited by examiner

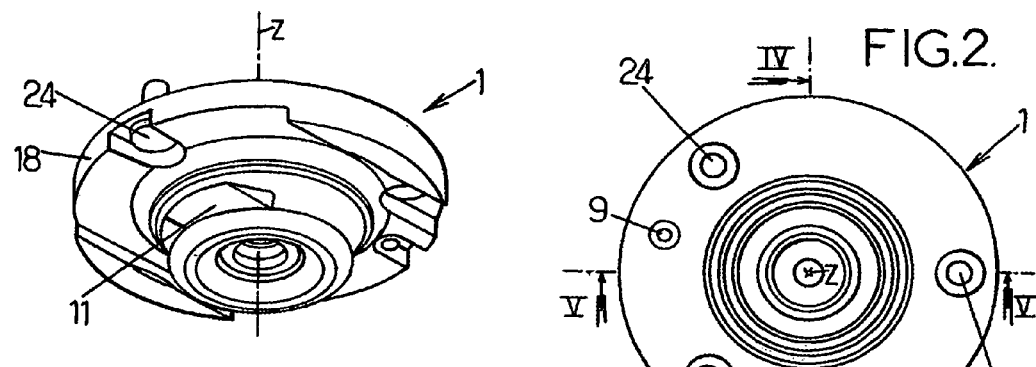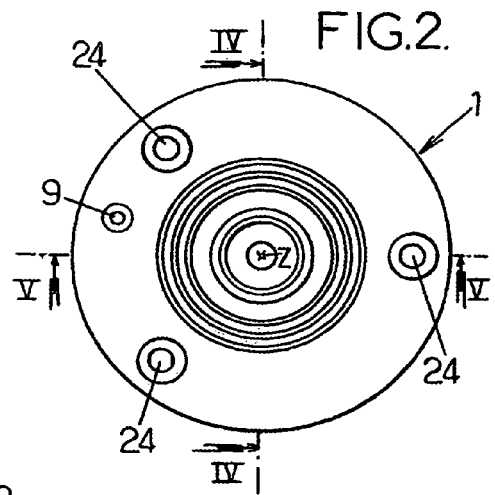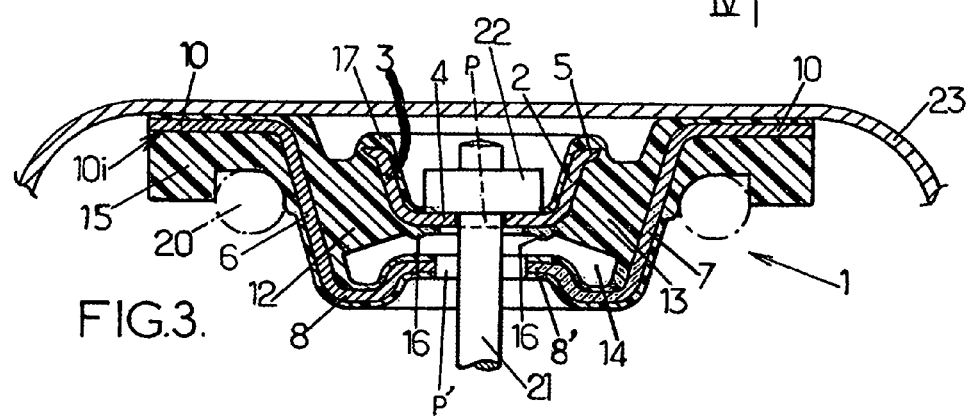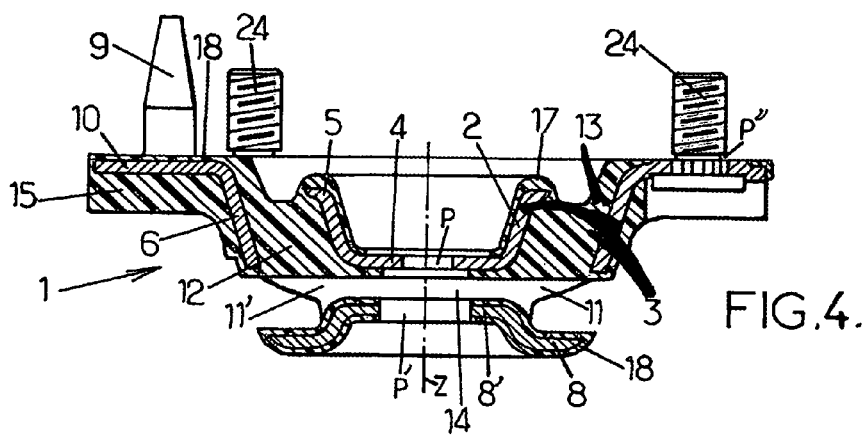

SUSPENSION SUPPORT DEVICE AND A VEHICLE INCLUDING SUCH A DEVICE

The invention relates to suspension support devices and to vehicles including such devices.

More particularly, the present invention relates to a suspension support device for integrating between firstly an assembly comprising a suspension spring and a shock absorber, and secondly the body of a motor vehicle, the device comprising:

an inner strength member comprising a support base and an annular side wall surrounding the support base, said strength member being adapted to be fixed to a top portion of the shock absorber;

an outer strength member suitable for being fixed to the vehicle body, having at least one side wall surrounding the side wall of the inner strength member, at least in part, said outer strength member being adapted to serve as a support for the suspension spring and including a bottom portion disposed beneath the support base of the inner strength member, extending substantially parallel to said support base, and presenting a central passage for passing said top portion of the shock absorber; and an elastomer body including a load-carrying portion, said load-carrying portion interconnecting the inner and outer strength members.

By way of example, a device of the kind in question is described in U.S. Pat. No. 6,293,572.

Such a device gives good results. Nevertheless it has been found to be desirable to further improve it to make it more flexible.

For this purpose, in a first aspect, the present invention provides a device of the kind in question, characterized in that the side wall of the outer strength member includes at least one window disposed at an intermediate level between the support base of the inner strength member and the bottom portion of the outer strength member, the device including a cavity under the load-carrying portion of the elastomer body.

Such a device makes it possible to increase the flexibility of the device and to be effective in preventing any excessive expansion of the assembly comprising the shock absorber and the suspension spring, for example after compression of large amplitude (rebound), while enabling the device to be very compact in the vertical direction.

Where appropriate, the entire device of the invention can thus be completely integrated under the body of the vehicle, without projecting above the vehicle body.

A device of the invention is thus compatible with safety measures that are tending to impose more and more constraints on the vertical height of vehicle hoods, in particular for limiting the consequences of a collision with a pedestrian.

In embodiments of the suspension support device of the invention, recourse may optionally be had to one or more of the following dispositions:

the device includes at least a first flexible abutment of elastomer fixed to the support base of the inner strength member or to the bottom portion of the outer strength member; this disposition makes it possible to combine a damping effect with a travel-limiting effect;

a first flexible abutment is fixed beneath the support base of the inner strength member;

at least a first flexible abutment of elastomer fixed under the support base of the inner strength member or on the bottom portion of the outer strength member forms part of the elastomer body; the elastomer body and said abutment can be made in a single molding operation, thereby simplifying assembly of the device, and thus reducing its cost;

the side wall of the outer strength member defines an inside space in which the inner strength member is contained in full, thereby further enabling the overall size of the device of the invention to be reduced;

the side wall of the outer strength member includes a top portion extended by an outwardly-extending rim, said rim being adapted to be fixed under the vehicle body;

the side wall of the inner strength member includes a top portion provided with at least one second elastomer abutment that is directed upwards, to come into abutment against the vehicle body; this disposition serves to limit the shortening of the assembly comprising the shock absorber and the suspension spring in the event of a large amount of compression, in particular;

a second elastomer abutment of the top portion of the inner strength member forms part of the elastomer body; the elastomer abutment is thus molded together with the elastomer body, thereby simplifying assembly of the device and reducing its cost;

the elastomer body covers all of the inner and outer strength members and constitutes at least a portion of the support lining for the suspension spring; and the bottom portion of the outer strength member describes an extension going towards and facing the support base of the inner strength member.

In a second aspect, the invention provides a motor vehicle having a body, at least one shock absorber, at least one suspension spring, and at least one support device, the inner strength member being fixed to a top portion of the shock absorber while the outer strength member is fixed to the body of the vehicle, the suspension spring bearing under said outer strength member.

In an embodiment of the motor vehicle of the invention, the side wall of the outer strength member has a top portion extended by an outwardly-extending rim which is fixed under the body of the vehicle, and the side wall of the inner strength member has a top portion fitted with a second abutment made of elastomer and directed upwardly, adapted to come into abutment under the body of the vehicle.

Other characteristics and advantages of the invention appear further on reading the following description. The description is purely illustrative and should be read with reference to the accompanying drawings, in which:

FIG. 1 is a perspective view from beneath of a device constituting an embodiment of the invention;

FIG. 2 is a view from above of the device shown in FIG. 1;

FIG. 3 is a section view on line III—III of the device shown in FIG. 2; and

FIG. 4 is a section view on line IV—IV of the device shown in FIG. 2.

In the various figures, elements that are identical or similar are given the same references.

The suspension support device 1 shown in the drawings comprises an inner strength member 2 in the form of a cup having an annular side wall 3 centered about a vertical axis Z. The side wall 3 is extended radially inwards at its bottom end by a support base 4 that lies in a plane perpendicular to the axis Z and that is provided with a passage P centered on the axis Z in order to pass a top portion of a shock absorber 21 (in particular the rod of the shock absorber) to which the device 1 is fixed. The top portion of the side wall 3 of the inner strength member 2 is extended by a rim 5 that extends outwards in a plane perpendicular to the axis Z.

The suspension support device 1 further comprises an outer strength member 6 likewise substantially in the shape of a cup. The outer strength member 6 has an annular side wall 7 centered on the axis Z and surrounding the side wall 3 of the inner strength member 2. The annular side wall 7 defines an inside space E containing the inner strength member 2 in full in the example shown.

The outer strength member 6 further comprises a bottom portion 8 which is placed under the support base 4 of the inner strength member 2 and which extends the bottom end of the side wall 7 radially inwards. This bottom portion presents an annular extension 8' facing the support base 4 and extending towards said support base 4. The bottom portion 8 further comprises a passage P' centered on the axis Z for passing and fixing the top portion 21 of the shock absorber.

The top portion of the side wall 7 of the outer strength member 6 is extended by a rim 10 extending outwards in a plane perpendicular to the axis Z and fixed under the body 23 of the vehicle.

By way of example, the rim 10 has passages P''' for passing fixing screws 24 that are screwed into the body of the vehicle. The rim 10 may further include a centering peg 9 extending upwards parallel to the axis Z.

The side wall 7 of the outer strength member 6 has two opposite windows 11 and 11' disposed at a level situated between the support base 4 of the inner strength member 2 and the bottom portion 8 of the outer strength member 6.

The device of the invention 1 described herein further comprises an elastomer body 12. This elastomer body 12 has a load-carrying portion 13 interconnecting the outer and inner surfaces of the side walls 3 and 7 respectively of the inner and outer strength members 2 and 6.

The device 1 also includes a cavity 14 under the load-carrying portion 13 of the elastomer body 12 in a space situated between the support base 4 of the inner strength member 2 and the bottom portion 8 of the outer strength member, facing the windows 11, 11'.

The elastomer body 12 also has a support liner portion 15 situated on the bottom face 10i of the rim 10 of the outer strength member 6.

The elastomer body 12 forms flexible abutments 16 referred to as "rebound" abutments, under the support base of the inner strength member 2 and facing downwards, facing the bottom portion 8 of the outer strength member 6.

The elastomer body 12 also has flexible abutments 17 referred to as "shock" abutments, on the rim 5 of the inner strength member 2 and facing upwards.

The surfaces of the inner and outer strength members 2 and 6 that are not covered by the above-described portions of the elastomer body 12 may be covered in a thin layer 18 of the elastomer body 12.

The suspension spring 20 comes to bear against the support liner 15 disposed under the rim 10 of the outer strength member 6.

A top threaded rod 21 of the shock absorber passes through the passages P and P' described respectively in the support base 4 and in the bottom portion 8 of the inner and outer strength members 2 and 6. The top portion of the shock absorber 21 is secured to the device 1, e.g. by means of a nut 22 which is screwed onto said top portion of the shock absorber 21 and which comes to bear against the support base 4 of the inner strength member 2.

The suspension support device 1 in the embodiment described herein thus enables connection and damping functions to be performed between the vehicle body 23 and the shock absorber 21, in particular because of the load-carrying portion 13 of the elastomer body 12 interconnecting the two strength members 2 and 6. The device of the invention as described also performs connection and damping functions between the vehicle body 23 and the spring 20, in particular because of the support liner 15 disposed between the spring 20 and the outer strength member 6 which is fixed to the vehicle body 23.

The travel of the shock absorber relative to the vehicle body is limited in compression and in extension by the device 1. In compression, the shock abutments 17 overlying the rim 5 of the inner strength member 2 are flattened against the underside of the vehicle body, thus limiting travel. In extension, the support base 4 of the inner strength member 2 comes to bear against the bottom portion 8 of the outer strength member 6 through the cavity 14 formed in the device 1 between the support base 4 of the inner strength member 2 and the bottom portion 8 of the outer strength member, with the rebound abutments 16 providing a flexible stop (it should be observed that in order to perform the same function, the rebound abutments 16 in a different embodiment could be disposed on top of the bottom portion 8 of the outer strength member 6).

The presence of the cavity 14 under the load-carrying portion of the elastomer body also provides the suspension support device 1 of the invention with greater flexibility.

As described above, by integrating the various damping, connection, and stroke-limiting functions of the device, and in particular by integrating the rebound abutment all inside the housing defined by the side wall 7 of the outer strength member 6, it is possible to obtain a device that is very compact, and that can be received in full under the vehicle body 23.

Furthermore, it provides the advantage of being capable of being made using only two different strength members and a single elastomer molding. Such a device of the invention is thus very simple to assemble, and of low cost.

The invention claimed is:

1. A suspension support device for integrating between firstly an assembly comprising a suspension spring and a shock absorber, and secondly a body of a motor vehicle, the device comprising: an inner strength member comprising a support base and an annular side wall surrounding the support base, said strength member being adapted to be fixed to a top portion of the shock absorber; an outer strength member suitable for being fixed to the vehicle body, having at least one side wall surrounding the side wall of the inner strength member, at least in part, said outer strength member being adapted to serve as a support for the suspension spring and including a bottom portion disposed beneath the support base of the inner strength member, extending substantially parallel to said support base, and presenting a central passage for passing said top portion of the shock absorber; and an elastomer body including a load-carrying portion, said load-carrying portion interconnecting the inner and outer strength members; wherein the side wall of the outer strength member includes at least one window formed through an aperture in said outer strength member, said window being disposed at an intermediate level between the support base of the inner strength member and the bottom portion of the outer strength member, the device including a cavity under the load-carrying portion of the elastomer body.

2. A support device according to claim 1, including at least a first elastomer abutment that is flexible and fixed to a first element selected from the support base of the inner strength member and the bottom portion of the outer strength member, said flexible first abutment being disposed facing a second element selected between said support base and said bottom portion.

3. A support device according to claim 2, in which said first abutment is fixed under the support base of the inner strength member.

4. A support device according to claim 3, in which said first abutment is formed integrally with the elastomer body.

5. A support device according to claim 1, in which the side wall of the outer strength member defines an inside space in which the inner strength member is contained in full.

6. A support device according to claim 1, in which the side wall of the outer strength member includes a top portion extended by a rim that extends outwards, said rim being adapted to be fixed under the vehicle body.

7. A support device according to claim 1, in which the side wall of the inner strength member includes a top portion lined with at least one second elastomer abutment facing upwards for the purpose of coming into abutment under the vehicle body.

8. A support device according to claim 7, in which said second abutment is formed integrally with the elastomer body.

9. A support device according to claim 1, in which the elastomer body covers the inner and outer strength members (2, 6) and forms a downwardly-facing support liner for the suspension spring.

10. A support device according to claim 1, in which the bottom portion of the outer strength member defines an extension extending towards and facing the support base of the inner strength member.

11. A motor vehicle including a body, at least one shock absorber, at least one suspension spring, and at least one support device according to claim 1, the inner strength member being fixed to a top portion of the shock absorber while the outer strength member is fixed to the vehicle body, the suspension spring bearing against the underside of said outer strength member.

12. A motor vehicle according to claim 11, in which: the side wall of the outer strength member has a top portion extended by a rim extending outwards and fixed under the vehicle body; and the side wall of the inner strength member has a top portion lined with an upwardly-facing elastomer abutment adapted to come into abutment against the underside of the vehicle body.

* * * * *